United States Patent
Lakkis

(10) Patent No.: US 8,477,827 B2
(45) Date of Patent: Jul. 2, 2013

(54) SPREAD-SPECTRUM CODING OF DATA BURSTS

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/446,260

(22) Filed: Apr. 13, 2012

(65) Prior Publication Data

US 2012/0195349 A1     Aug. 2, 2012

Related U.S. Application Data

(62) Division of application No. 12/412,797, filed on Mar. 27, 2009.

(60) Provisional application No. 61/052,221, filed on May 11, 2008.

(51) Int. Cl.
*H04B 1/69* (2011.01)

(52) U.S. Cl.
USPC .......................................................... 375/146

(58) Field of Classification Search
USPC ................. 375/130, 140, 146, 148, 350, 260, 375/295, 299; 370/203, 208, 209, 210
See application file for complete search history.

(56) References Cited

U.S. PATENT DOCUMENTS

| 7,551,546 | B2 | 6/2009 | Ma et al. |
| 7,729,433 | B2 | 6/2010 | Jalloul et al. |
| 2002/0051462 | A1 | 5/2002 | Ertel et al. |
| 2005/0135229 | A1 | 6/2005 | Molisch et al. |
| 2006/0211378 | A1* | 9/2006 | Gaal et al. ........................ 455/69 |
| 2006/0274839 | A1* | 12/2006 | Fukuta et al. .................. 375/260 |
| 2006/0285602 | A1* | 12/2006 | Lim ................................ 375/260 |
| 2007/0076784 | A1 | 4/2007 | Zhou et al. |
| 2007/0140105 | A1* | 6/2007 | Coon ............................. 370/208 |
| 2008/0101441 | A1 | 5/2008 | Palanki et al. |
| 2008/0225895 | A1 | 9/2008 | Lee et al. |
| 2009/0232244 | A1 | 9/2009 | Kawasaki |
| 2009/0279590 | A1 | 11/2009 | Lakkis |

FOREIGN PATENT DOCUMENTS

| CN | 1881974 A | 12/2006 |
| JP | 2000353986 A | 12/2000 |
| JP | 2002344358 A | 11/2002 |
| JP | 2003503887 A | 1/2003 |
| JP | 2005184812 A | 7/2005 |
| JP | 2009225147 A | 10/2009 |
| KR | 20070022614 A | 2/2007 |
| WO | 9522213 A1 | 8/1995 |
| WO | 0101605 A1 | 1/2001 |

OTHER PUBLICATIONS

Khiam Boon Png et al., IEEE publication "Mobility-Based Interference Cancellation Scheme for BS-IFDMA Systems with Optimum Code Assignment," IEEE, 2013, pp. 1-13.*

(Continued)

*Primary Examiner* — Tesfaldet Bocure
(74) *Attorney, Agent, or Firm* — Dang M. Vo

(57) ABSTRACT

Certain aspects of the present disclosure relate to a method for generating spread-spectrum coded signals for transmission in a wireless communication system, and particularly for generating spread sequences of data with spreading codes that facilitate computationally efficient frequency-domain processing at a receiver.

17 Claims, 9 Drawing Sheets

OTHER PUBLICATIONS

Goto Y., et al., "Variable Spreading and Chip Repetition Factors (VSCRF)-CDMA in Reverse Link for Broadband Packet Wireless Access" IEICE Transactions on Communications, Communications Society, Tokyo, JP, vol. E88-B, No. 2, Feb. 1, 2005, pp. 509-519, XP001225513 ISSN: 0916-8516.

International Search Report and Written Opinion—PCT/US2009/043100—ISA/EPO—Aug. 12, 2009.

Sorger U., et al., "Interleaved FDMA-a new spread-spectrum multiple-access scheme" Communications, 1998. ICC 98. Conference Record. 1998 IEEE Internation AL Conference on Atlanta, GA, USA Jun. 7-11, 1998, New York, NY, USA, IEEE, US, vol. 2, Jun. 7, 1998, pp. 1013-1017, XP010284733 ISBN: 978-0-7803-4788-5.

Alexander A., et al., "Interleaved Frequency-Division Multiple-Access System with Frequency Domain Equalization", IEEE, Jun. 7, 2012 (date accessed from Google, no date in the publication) pp. 1-5.

Peng X., et al., "Block Spread IFDMA: An Improved Uplink Transmission Scheme", IEEE, 2007, pp. 1-4.

Taiwan Search Report—TW098115592—TIPO—Oct. 16, 2012.

* cited by examiner

SPREAD-SPECTRUM CODING OF DATA BURSTS

CLAIM OF PRIORITY UNDER 35 U.S.C. §119

The present application for patent is a Divisional of U.S. patent application Ser. No. 12/412,797 entitled "SPREAD-SPECTRUM CODING OF DATA BURSTS," filed Mar. 27, 2009, which claims priority to Provisional Application No. 61/052,221 filed May 11, 2008, and assigned to the assignee hereof and hereby expressly incorporated by reference herein.

BACKGROUND

1. Field

Certain aspects of the present disclosure generally relate to a wireless communication and, more particularly, to a method for spreading of a transmission signal.

2. Background

Spread-spectrum coding is a technique by which signals generated in a particular bandwidth can be spread in a frequency domain, resulting in a signal with a wider bandwidth. The spread signal has a lower power density, but the same total power as an un-spread signal. The expanded transmission bandwidth minimizes interference to others transmissions because of its low power density. At the receiver, the spread signal can be decoded, and the decoding operation provides resistance to interference and multipath fading. However, processing at the receiver can be computationally complex with a prohibitively high latency.

Therefore, there is a need in the art for a method of spread-spectrum coding applied at a transmitter that facilitates processing at a receiver.

SUMMARY

Certain aspects provide a method for wireless communications. The method generally includes partitioning a data stream into sub-blocks of data, spreading each sub-block using a matrix with M orthogonal rows, wherein the spreading comprises repeating each sub-block M times and applying each row of the matrix to one of the repeated sub-blocks to generate a spread data stream, and transmitting the spread data stream.

Certain aspects provide an apparatus for wireless communications. The apparatus generally includes a circuit configured to partition a data stream into sub-blocks of data, a spreader configured to spread each sub-block using a matrix with M orthogonal rows, wherein the spreader comprises a circuit configured to repeat each sub-block M times and a circuit configured to apply each row of the matrix to one of the repeated sub-blocks to generate a spread data stream, and a transmitter configured to transmit the spread data stream.

Certain aspects provide an apparatus for wireless communications. The apparatus generally includes means for partitioning a data stream into sub-blocks of data, means for spreading each sub-block using a matrix with M orthogonal rows, wherein the means for spreading comprises means for repeating each sub-block M times and means for applying each row of the matrix to one of the repeated sub-blocks to generate a spread data stream, and means for transmitting the spread data stream.

Certain aspects provide computer-program product for wireless communications. The computer-program product includes a computer-readable medium encoded with instructions executable to partition a data stream into sub-blocks of data, spread each sub-block using a matrix with M orthogonal rows, wherein the instructions executable to spread comprise instructions executable to repeat each sub-block M times and instructions executable to apply each row of the matrix to one of the repeated sub-blocks to generate a spread data stream, and transmit the spread data stream.

Certain aspects provide an access point. The access point generally includes at least one antenna, a circuit configured to partition a data stream into sub-blocks of data, a spreader configured to spread each sub-block using a matrix with M orthogonal rows, wherein the spreader comprises a circuit configured to repeat each sub-block M times and a circuit configured to apply each row of the matrix to one of the repeated sub-blocks to generate a spread data stream, and a transmitter configured to transmit via the at least one antenna the spread data stream.

Certain aspects provide a method for wireless communications. The method generally includes receiving a spread data stream generated by spreading sub-blocks of data using a matrix with M orthogonal rows, wherein the spreading comprises repeating each sub-block of data M times and applying each row of the matrix to one of the repeated sub-blocks to generate the spread data stream, and combining sub-blocks of the received spread data stream, wherein the combination is based on the matrix with M orthogonal rows to generate M sets of combined sub-blocks.

Certain aspects provide an apparatus for wireless communications. The apparatus generally includes a receiver configured to receive a spread data stream generated by spreading sub-blocks of data using a matrix with M orthogonal rows, wherein the spreading comprises repeating each sub-block of data M times and applying each row of the matrix to one of the repeated sub-blocks to generate the spread data stream, and a combiner configured to combine sub-blocks of the received spread data stream, wherein the combination is based on the matrix with M orthogonal rows to generate M sets of combined sub-blocks.

Certain aspects provide an apparatus for wireless communications. The apparatus generally includes means for receiving a spread data stream generated by spreading sub-blocks of data using a matrix with M orthogonal rows, wherein the spreading comprises repeating each sub-block of data M times and applying each row of the matrix to one of the repeated sub-blocks to generate the spread data stream, and means for combining sub-blocks of the received spread data stream, wherein the combination is based on the matrix with M orthogonal rows to generate M sets of combined sub-blocks.

Certain aspects provide computer-program product for wireless communications. The computer-program product includes a computer-readable medium encoded with instructions executable to receive a spread data stream generated by spreading sub-blocks of data using a matrix with M orthogonal rows, wherein the spreading comprises repeating each sub-block of data M times and applying each row of the matrix to one of the repeated sub-blocks to generate the spread data stream, and combine sub-blocks of the received spread data stream, wherein the combination is based on the matrix with M orthogonal rows to generate M sets of combined sub-blocks.

Certain aspects provide an access terminal. The access terminal generally includes at least one antenna a receiver configured to receive via the at least one antenna a spread data stream generated by spreading sub-blocks of data using a matrix with M orthogonal rows, wherein the spreading comprises repeating each sub-block of data M times and applying each row of the matrix to one of the repeated sub-blocks to generate the spread data stream, and a combiner configured to combine sub-blocks of the received spread data stream, wherein the combination is based on the matrix with M orthogonal rows to generate M sets of combined sub-blocks.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be advantageous to systems employing Ultra Wide Band (UWB) signals including millimeter-wave signals, and Code Division Multiple Access (CDMA) signals. However, the present disclosure is not intended to be limited to such systems, as other coded signals may benefit from similar advantages.

Figure 1:
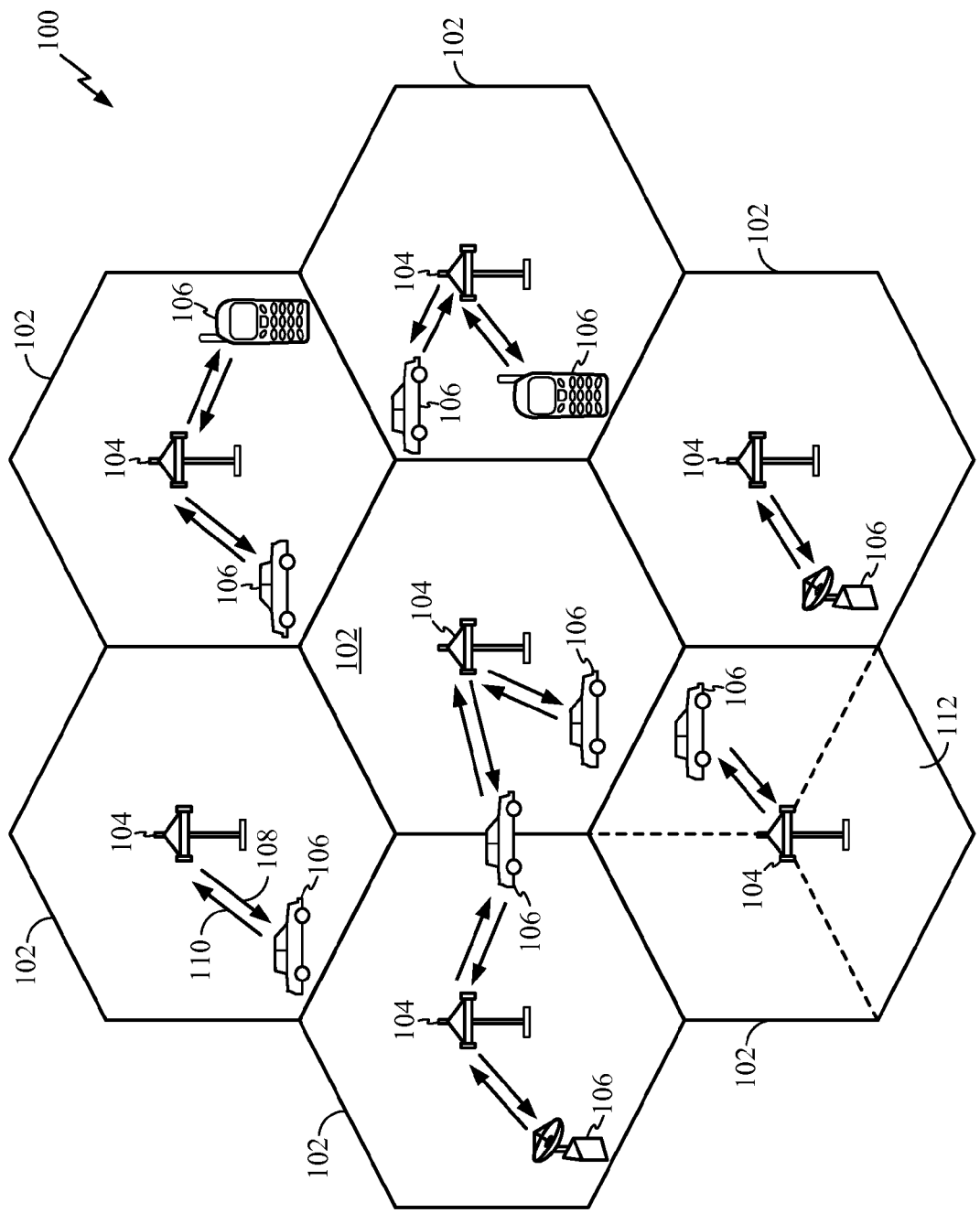
FIG. 1 illustrates an example wireless communication system, in accordance with certain aspects of the present disclosure.

FIG. 1 illustrates an example of a wireless communication system 100 in which aspects of the present disclosure may be employed. The wireless communication system 100 may be a broadband wireless communication system. The wireless communication system 100 may provide communication for a number of cells 102, each of which is serviced by an access point 104. An access point 104 may be a fixed station that communicates with access terminals 106. FIG. 1 depicts various access terminals 106 dispersed throughout the system 100.

An access point 104 is generally a fixed station that communicates with the access terminals 106 and may also be referred to as a base station or some other terminology. The access terminals 106 may be fixed (i.e., stationary) or mobile. The access terminals 106 may alternatively be referred to as remote stations, access terminals, terminals, subscriber units, mobile stations, stations, user equipment, or by some other terminology. The access terminals 106 may be wireless devices, such as cellular phones, personal digital assistants (PDAs), handheld devices, wireless modems, laptop computers, personal computers, or some other wireless device. An access point 104 may communicate with one or more access terminals 106 at any given moment on the downlink and uplink. The downlink (i.e., forward link) is the communication link from the access point 104 to the access terminals 106, and the uplink (i.e., reverse link) is the communication link from the access terminals 106 to the access point 104. An access terminal 106 may also communicate peer-to-peer with another access terminal 106.

A variety of algorithms and methods may be used for transmissions in the wireless communication system 100 between the access points 104 and the access terminals 106. For example, signals may be sent and received between the access points 104 and the access terminals 106 in accordance with CDMA technique. If this is the case, the wireless communication system 100 may be referred to as a CDMA system.

A communication link that facilitates transmission from an access point 104 to an access terminal 106 may be referred to as a downlink (DL) 108, and a communication link that facilitates transmission from an access terminal 106 to an access point 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Access points 104 within a wireless communication system 100 may utilize antennas that concentrate the flow of power within a particular sector 112 of the cell 102. Such antennas may be referred to as directional antennas.

Figure 2:
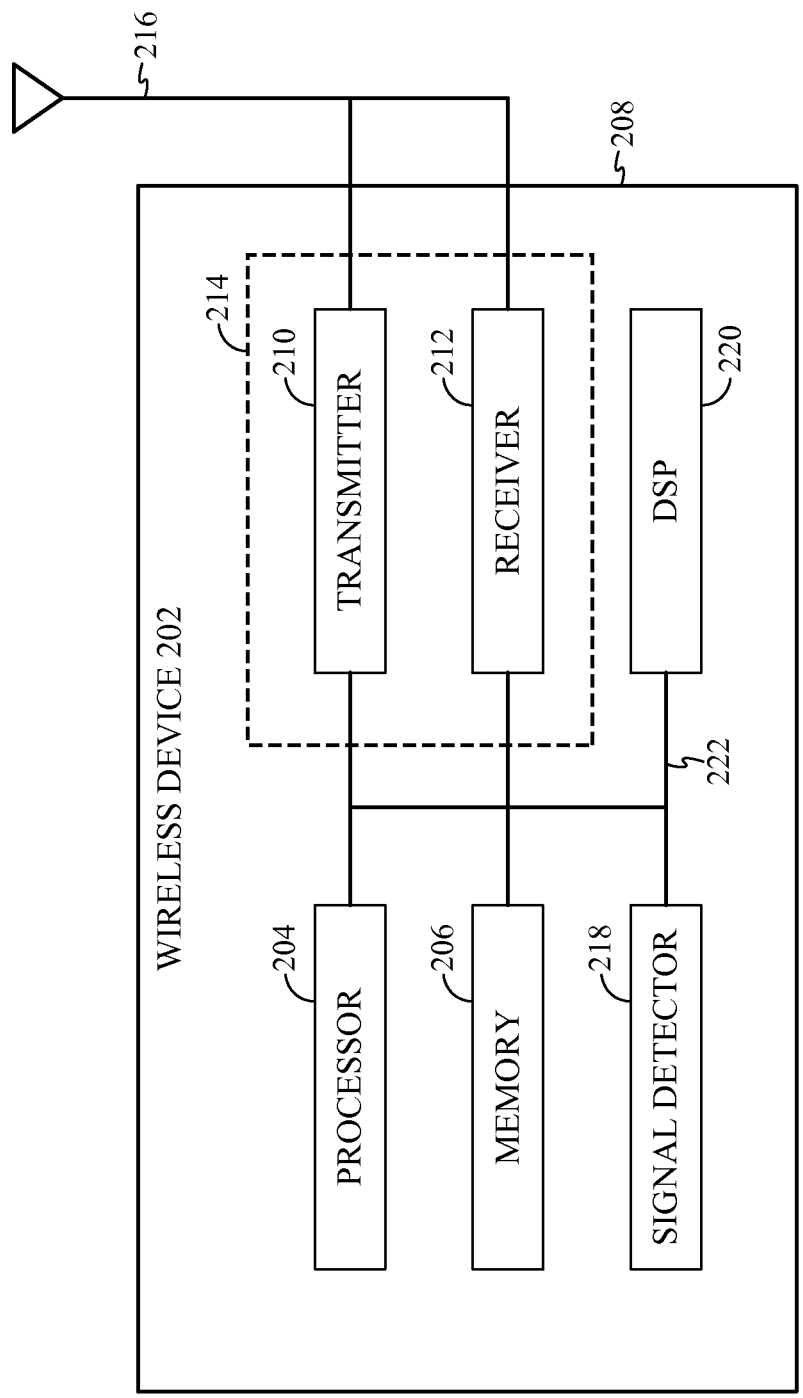
FIG. 2 illustrates various components that may be utilized in a wireless device in accordance with certain aspects of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be an access point 104 or an access terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Spreading of Transmission Signal

Figure 3:
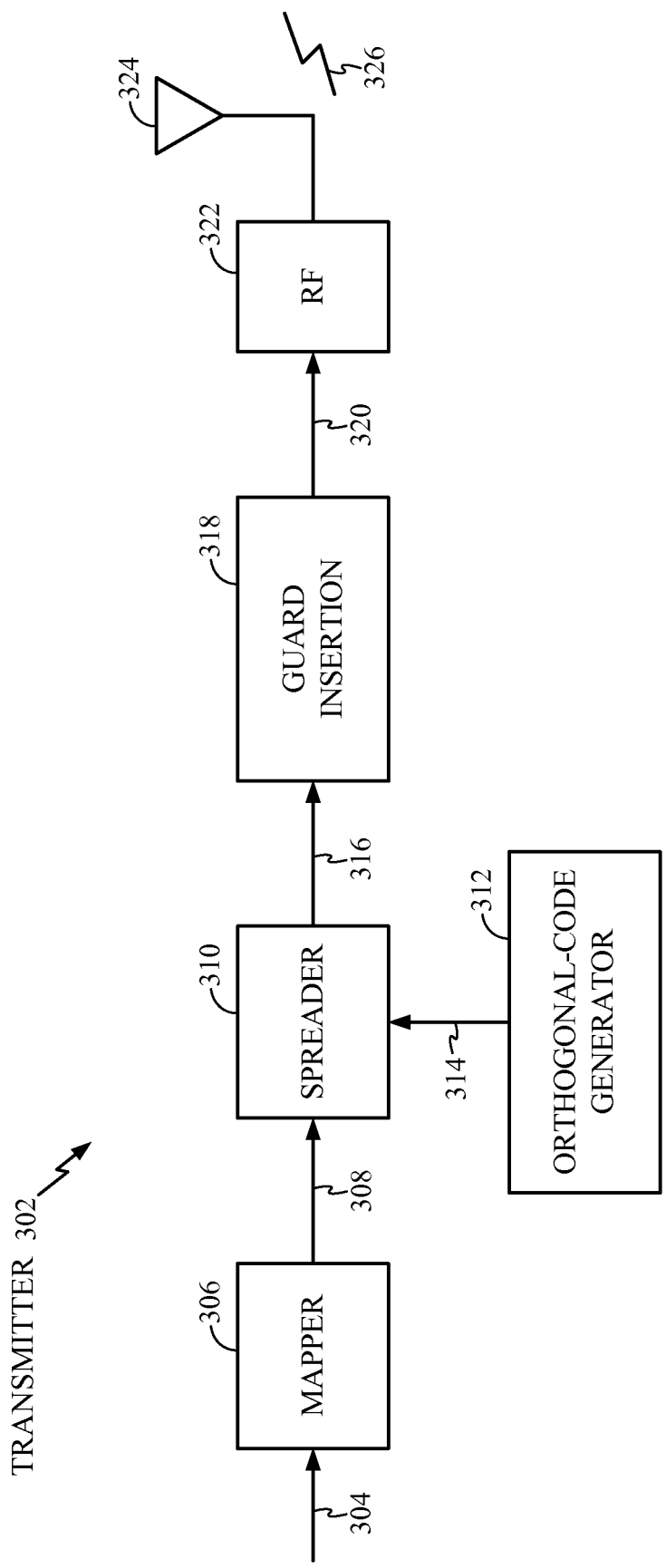
FIG. 3 illustrates an example transmitter that may be used within a wireless communication system in accordance with certain aspects of the present disclosure.

FIG. 3 illustrates an example of a transmitter 302 that may be used within a wireless communication system 100 that utilizes CDMA or some other transmission technique. Portions of the transmitter 302 may be implemented in the transmitter 210 of a wireless device 202. The transmitter 302 may be implemented in an access point 104 for transmitting data 304 to an access terminal 106 on a downlink 108. The transmitter 302 may also be implemented in an access terminal 106 for transmitting data 304 to an access point 104 on an uplink 110.

Data 304 to be transmitted are shown being provided as input to a mapper 306. The mapper 306 may map the data streams 304 onto constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 306 may output a symbol stream 308, which may represents one input into a burst spreader 310. Another input in the burst spreader 310 may be comprised of a plurality of orthogonal spreading codes 314 produced by an orthogonal-code generator 312.

The burst spreader 310 may be configured for spreading each data burst 308 with one of the plurality of orthogonal spreading codes from the orthogonal-code generator 312. A guard interval or a cyclic prefix (CP) may be appended to the beginning of each spread data burst 316 by a guard insertion unit (or a CP appender) 318. The output 320 of the guard insertion unit may then be up-converted to a desired transmit frequency band by a radio frequency (RF) front end 322. An antenna 324 may then transmit the resulting signal 326.

In one aspect of the present disclosure, the spreading-code generator 312 may be configured to generate a pair of length-2 Hadamard codes that can be expressed by the following matrix:

$$H = \begin{bmatrix} 1 & 1 \\ 1 & -1 \end{bmatrix}. \tag{1}$$

The spreading-code generator 312 may repeat the first row of the matrix H from equation (1) a defined number of times in order to generate a first spreading code $s_{0:N-1}^1$ having the length N. Similarly, the spreading-code generator 312 may repeat the second row of the matrix H the same defined number of times to generate a second spreading code $s_{0:N-1}^2$, also having the length N.

For this particular aspect, the first and second spreading codes may be expressed as:

$$s_{0:N-1}^0 = [1\ 1\ 1\ 1\ \ldots\ 1\ 1\ 1\ 1], \text{ and}$$

$$s_{0:N-1}^1 = [1\ -1\ 1\ -1\ \ldots\ 1\ -1\ 1\ -1]. \tag{2}$$

Thus, if the input data stream 308 is given by N modulated symbols $d_{0:N-1} = [d_0, d_1, d_2, d_3, \ldots d_{N-1}]$, then the first spread data sequence 316 may be represented as $[d_0, d_1, d_2, d_3, \ldots d_{N-1}]$, and the consecutive second spread data sequence 316 may be represented as $[d_0, -d_1, d_2, -d_3, \ldots -d_{N-1}]$.

It should be appreciated that in other aspects of the present disclosure alternative multiple-access codes may be employed for spreading of transmission signal. Furthermore, variations of the code parameters may be provided without departing from the scope of the disclosure. For example, codes may be repeated, concatenated, and/or truncated in any combination.

For certain aspects of the present disclosure, the burst spreader 310 may perform an element-by-element multiplication of a length-N data burst $d_{0:N-1}$ with each length-N spreading code $s_{0:N-1}^1$ and $s_{0:N-1}^2$. For example, the data burst $d_{0:N-1}$ may be spread by the first spreading code $s_{0:N-1}^1$ to produce a first spread data burst. A replica of the data burst $d_{0:N-1}$ may be spread by the second spreading code $s_{0:N-1}^2$ to produce a second spread data burst.

The cyclic prefix appender (or the guard insertion unit) 318 may append the cyclic prefix or guard interval to the beginning of each spread data burst 316. A cyclic prefix may comprise a copy of the last L chips of the spread data burst. For certain aspects of the present disclosure, the cyclic prefix may also be the Golay sequence a or the Golay sequence b that represent a complementary pair of Golay sequences of a given length. For example, the following complementary pair of Golay sequences of length 64 samples may be utilized:

$$a = 8822BB11782D4BIE, \tag{3}$$

$$b = 77DDBB1187D24BIE, \tag{4}$$

where the sequences from equations (3)-(4) are expressed in hexadecimal notation, and wherein the least significant byte is to the left and the most significant byte is to the right. The appended Golay code may also alternate or otherwise change sequences a and b.

Figure 4:
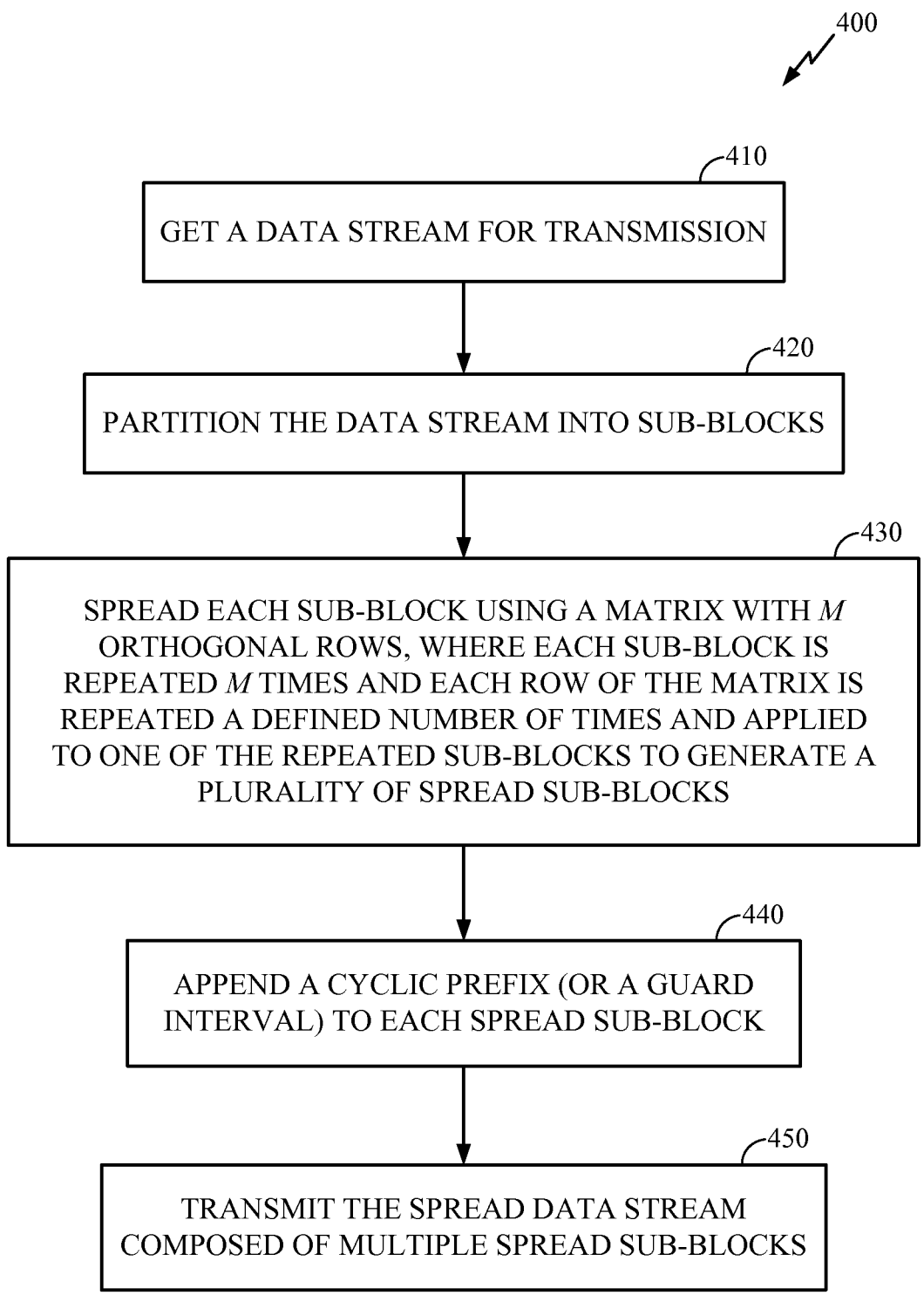
FIG. 4 illustrates example operations for spread-spectrum coding in accordance with certain aspects of the present disclosure.

FIG. 4 illustrates example operations 400 that summarize the spread-spectrum coding applied at a transmission side of the wireless communication system. At 410, an original transmission data stream may be obtained. Then, at 420, the data stream may be partitioned into sub-blocks. At 430, each sub-block may be spread using a multiple access code matrix with M orthogonal rows (e.g., a Hadamard matrix) to generate a spread data stream. Each row (or column) of the matrix may be repeated a defined number of times to produce a plurality of spreading codes, each having the length N. For certain aspects of the present disclosure, an M×M multiple-access coding matrix may be produced, and up to M spreading codes may be generated.

Spreading, at 430, may be implemented for certain aspects by performing an element-by-element multiplication (or, alternatively, an element-by-element XOR operation) of the same data burst (i.e., the same data sub-block) of size N repeated M times with each of the M spreading codes, wherein each spreading code of the original size M is repeated N/M times. At 440, spreading may be followed by appending a cyclic prefix (e.g., a copy of the last L chips of the spread sub-block, a known Golay sequence, or a guard interval) to each spread sub-block. At 450, the spread data stream composed of a plurality of spread sub-blocks may be transmitted.

Figure 5A:
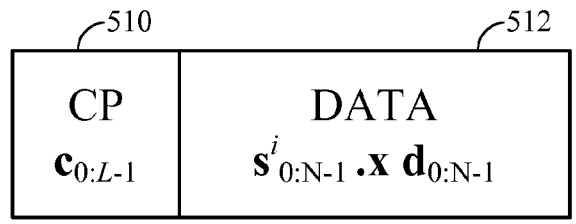
FIGS. 5A-5C illustrate spread data burst formats in accordance with certain aspects of the present disclosure.

FIG. 5A illustrates an example data burst format in accordance with one aspect of the present disclosure. Each burst comprises a total number of N+L symbols, wherein L is a number of symbols of a known sequence $c_{0:L-1}$, such as a guard interval or a cyclic prefix 510, and N is a number of symbols in a spread-data sequence 512. The spread-data sequence 512 may comprise an element-by-element multiplication of the length-N data burst $d_{0:N-1}$ with one of a plurality of length-N spreading codes $s_{0:N-1}^i$, i=1, 2, . . . , M.

Figure 5B:
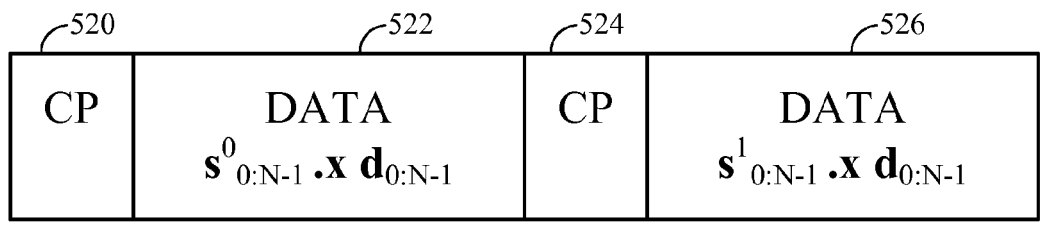

FIG. 5B illustrates an example data frame that comprises a sequence of two data bursts in accordance with one aspect of the disclosure. A first spread-data sequence 522 may comprise an element-by-element multiplication of the length-N data burst $d_{0:N-1}$ with a first spreading code $s_{0:N-1}^1$, and a second spread-data sequence 526 may comprise an element by-element multiplication of the same data burst $d_{0:N-1}$ with a second spreading code $s_{0:N-1}^2$. In one aspect of the present disclosure, a first and a second spreading codes may be generated by repeating rows (or columns) of a size 2×2 Hadamard matrix a defined number of times. The first spread-data sequence 522 may be provided with a cyclic prefix 520, and the second spread data sequence 526 may be provided with a cyclic prefix 524.

Figure 5C:
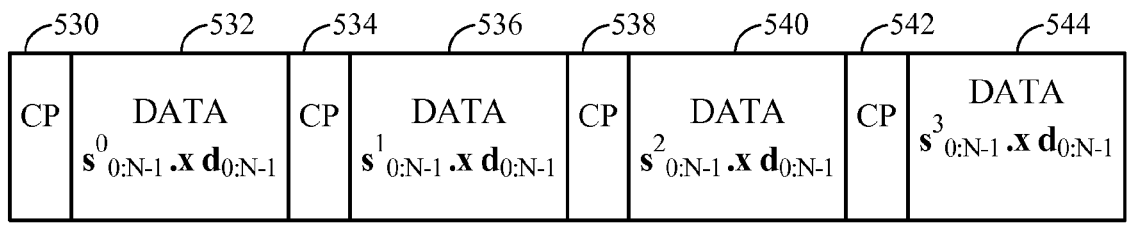

FIG. 5C illustrated a data frame comprising four spread-data sequences 532, 536, 540, and 544 corresponding to a size 4×4 Hadamard spreading matrix. For this aspect of the present disclosure, the spreading codes may be given as:

$$s_{0:N-1}^0 = [1\ 1\ 1\ 1\ \ldots\ 1\ 1\ 1\ 1],$$

$$s_{0:N-1}^1 = [1\ -1\ 1\ -1\ \ldots\ 1\ -1\ 1\ -1],$$

$$s_{0:N-1}^2 = [1\ 1\ -1\ -1\ \ldots\ 1\ 1\ -1\ -1], \text{ and}$$

$$s_{0:N-1}^3 = [1\ -1\ -1\ 1\ \ldots\ 1\ -1\ -1\ 1], \quad (5)$$

wherein first four chips of each spreading code may correspond to a particular row of the size 4×4 Hadamard spreading matrix.

As there are a wide variety of aspects of the present disclosure, the mathematical expressions used to explain specific aspects may be generalized to indicate how alternative aspects may be provided. For example, one aspect of the disclosure may employ up to 2M sequences derived from a Hadamard matrix of size 2M×2M, wherein each sequence may be periodic with period M. Specifically, the $m^{th}$ (m=0, 1, . . . , 2M−1) sequence may be periodic with period M, and elements within the period may be also elements of the $m^{th}$ row of the 2M×2M Hadamard matrix.

Equalization at the Receiver

Figure 6:
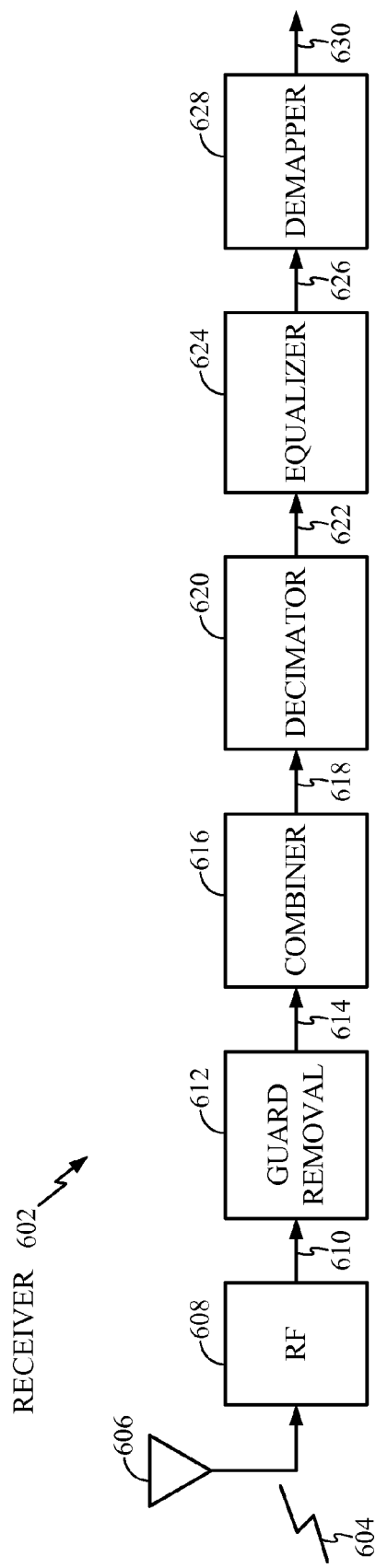
FIG. 6 illustrates an example receiver that may be used within a wireless communication system in accordance with certain aspects of the present disclosure.

FIG. 6 illustrates an example of a receiver 602 that may be used within a wireless device 202 that utilizes CDMA or some other transmission technique. Portions of the receiver 602 may be implemented in the receiver 212 of a wireless device 202. The receiver 602 may be implemented in an access terminal 106 for receiving data 604 from an access point 104 on a downlink 108. The receiver 602 may also be implemented in an access point 104 for receiving data 604 from an access terminal 106 on an uplink 110.

When a signal 604 is received by an antenna 606, it may be down-converted to a baseband signal 610 by an RF front end 608. A guard removal component 612 may then remove the guard interval that was inserted between each spread data burst by the guard insertion component 318 illustrated in FIG. 3. The output signal 614 of the guard removal component may be provided to a combiner unit (i.e., a sum and difference unit) 616, which may be configured to operate on received baseband signals characterized by the spread-data sequences after they have been propagating through a wireless communication channel.

For one aspect of the present disclosure wherein data may be spread using a pair of length-12 spreading codes generated from the 2×2 Hadamard matrix given by equation (1) and transmitted through a five-path multipath channel, the first spread-data sequence x at the receiver may be expressed by:

$$x = \begin{bmatrix} x_0 \\ x_1 \\ x_2 \\ x_3 \\ x_4 \\ x_5 \\ x_6 \\ x_7 \\ x_8 \\ x_9 \\ x_{10} \\ x_{11} \end{bmatrix} = \begin{bmatrix} h_0 & 0 & 0 & 0 & 0 & 0 & 0 & 0 & h_4 & h_3 & h_2 & h_1 \\ h_1 & h_0 & 0 & 0 & 0 & 0 & 0 & 0 & 0 & h_4 & h_3 & h_2 \\ h_2 & h_1 & h_0 & 0 & 0 & 0 & 0 & 0 & 0 & 0 & h_4 & h_3 \\ h_3 & h_2 & h_1 & h_0 & 0 & 0 & 0 & 0 & 0 & 0 & 0 & h_4 \\ h_4 & h_3 & h_2 & h_1 & h_0 & 0 & 0 & 0 & 0 & 0 & 0 & 0 \\ 0 & h_4 & h_3 & h_2 & h_1 & h_0 & 0 & 0 & 0 & 0 & 0 & 0 \\ 0 & 0 & h_4 & h_3 & h_2 & h_1 & h_0 & 0 & 0 & 0 & 0 & 0 \\ 0 & 0 & 0 & h_4 & h_3 & h_2 & h_1 & h_0 & 0 & 0 & 0 & 0 \\ 0 & 0 & 0 & 0 & h_4 & h_3 & h_2 & h_1 & h_0 & 0 & 0 & 0 \\ 0 & 0 & 0 & 0 & 0 & h_4 & h_3 & h_2 & h_1 & h_0 & 0 & 0 \\ 0 & 0 & 0 & 0 & 0 & 0 & h_4 & h_3 & h_2 & h_1 & h_0 & 0 \\ 0 & 0 & 0 & 0 & 0 & 0 & 0 & h_4 & h_3 & h_2 & h_1 & h_0 \end{bmatrix} \cdot \begin{bmatrix} a_0 \\ a_1 \\ a_2 \\ a_3 \\ a_4 \\ a_5 \\ a_6 \\ a_7 \\ a_8 \\ a_9 \\ a_{10} \\ a_{11} \end{bmatrix}, \quad (6)$$

and the second spread-data sequence y at the receiver may be expressed as:

$$y = \begin{bmatrix} y_0 \\ y_1 \\ y_2 \\ y_3 \\ y_4 \\ y_5 \\ y_6 \\ y_7 \\ y_8 \\ y_9 \\ y_{10} \\ y_{11} \end{bmatrix} = \tag{7}$$

$$\begin{bmatrix} h_0 & 0 & 0 & 0 & 0 & 0 & 0 & 0 & h_4 & -h_3 & h_2 & -h_1 \\ h_1 & -h_0 & 0 & 0 & 0 & 0 & 0 & 0 & 0 & -h_4 & h_3 & -h_2 \\ h_2 & -h_1 & h_0 & 0 & 0 & 0 & 0 & 0 & 0 & 0 & h_4 & -h_3 \\ h_3 & -h_2 & h_1 & -h_0 & 0 & 0 & 0 & 0 & 0 & 0 & 0 & -h_4 \\ h_4 & -h_3 & h_2 & -h_1 & h_0 & 0 & 0 & 0 & 0 & 0 & 0 & 0 \\ 0 & -h_4 & h_3 & -h_2 & h_1 & -h_0 & 0 & 0 & 0 & 0 & 0 & 0 \\ 0 & 0 & h_4 & -h_3 & h_2 & -h_1 & h_0 & 0 & 0 & 0 & 0 & 0 \\ 0 & 0 & 0 & -h_4 & h_3 & -h_2 & h_1 & -h_0 & 0 & 0 & 0 & 0 \\ 0 & 0 & 0 & 0 & h_4 & -h_3 & h_2 & -h_1 & h_0 & 0 & 0 & 0 \\ 0 & 0 & 0 & 0 & 0 & -h_4 & h_3 & -h_2 & h_1 & -h_0 & 0 & 0 \\ 0 & 0 & 0 & 0 & 0 & 0 & h_4 & -h_3 & h_2 & -h_1 & h_0 & 0 \\ 0 & 0 & 0 & 0 & 0 & 0 & 0 & -h_4 & h_3 & -h_2 & h_1 & -h_0 \end{bmatrix} \cdot \begin{bmatrix} a_0 \\ a_1 \\ a_2 \\ a_3 \\ a_4 \\ a_5 \\ a_6 \\ a_7 \\ a_8 \\ a_9 \\ a_{10} \\ a_{11} \end{bmatrix}.$$

For one aspect of the present disclosure, the combiner module 616 may combine the received signal vectors x and y in order to produce a sum vector u and a difference vectors v, i.e., a stream 618 illustrated in FIG. 6. The sum vector u and the difference vector v may be expressed as:

$$u = \begin{bmatrix} u_0 \\ u_1 \\ u_2 \\ u_3 \\ u_4 \\ u_5 \\ u_6 \\ u_7 \\ u_8 \\ u_9 \\ u_{10} \\ u_{11} \end{bmatrix} = \begin{bmatrix} (x_0 + y_0)/2 \\ (x_1 + y_1)/2 \\ (x_2 + y_2)/2 \\ (x_3 + y_3)/2 \\ (x_4 + y_4)/2 \\ (x_5 + y_5)/2 \\ (x_6 + y_6)/2 \\ (x_7 + y_7)/2 \\ (x_8 + y_8)/2 \\ (x_9 + y_9)/2 \\ (x_{10} + y_{10})/2 \\ (x_{11} + y_{11})/2 \end{bmatrix} = \tag{8}$$

$$\begin{bmatrix} h_0 & 0 & 0 & 0 & 0 & 0 & 0 & 0 & h_4 & 0 & h_2 & 0 \\ h_1 & 0 & 0 & 0 & 0 & 0 & 0 & 0 & 0 & 0 & h_3 & 0 \\ h_2 & 0 & h_0 & 0 & 0 & 0 & 0 & 0 & 0 & 0 & h_4 & 0 \\ h_3 & 0 & h_1 & 0 & 0 & 0 & 0 & 0 & 0 & 0 & 0 & 0 \\ h_4 & 0 & h_2 & 0 & h_0 & 0 & 0 & 0 & 0 & 0 & 0 & 0 \\ 0 & 0 & h_3 & 0 & h_1 & 0 & 0 & 0 & 0 & 0 & 0 & 0 \\ 0 & 0 & h_4 & 0 & h_2 & 0 & h_0 & 0 & 0 & 0 & 0 & 0 \\ 0 & 0 & 0 & 0 & h_3 & 0 & h_1 & 0 & 0 & 0 & 0 & 0 \\ 0 & 0 & 0 & 0 & h_4 & 0 & h_2 & 0 & h_0 & 0 & 0 & 0 \\ 0 & 0 & 0 & 0 & 0 & 0 & h_3 & 0 & h_1 & 0 & 0 & 0 \\ 0 & 0 & 0 & 0 & 0 & 0 & h_4 & 0 & h_2 & 0 & h_0 & 0 \\ 0 & 0 & 0 & 0 & 0 & 0 & 0 & 0 & h_3 & 0 & h_1 & 0 \end{bmatrix} \cdot \begin{bmatrix} a_0 \\ a_1 \\ a_2 \\ a_3 \\ a_4 \\ a_5 \\ a_6 \\ a_7 \\ a_8 \\ a_9 \\ a_{10} \\ a_{11} \end{bmatrix},$$

and $$v = \begin{bmatrix} v_0 \\ v_1 \\ v_2 \\ v_3 \\ v_4 \\ v_5 \\ v_6 \\ v_7 \\ v_8 \\ v_9 \\ v_{10} \\ v_{11} \end{bmatrix} = \begin{bmatrix} (x_0 + y_0)/2 \\ (x_1 + y_1)/2 \\ (x_2 + y_2)/2 \\ (x_3 + y_3)/2 \\ (x_4 + y_4)/2 \\ (x_5 + y_5)/2 \\ (x_6 + y_6)/2 \\ (x_7 + y_7)/2 \\ (x_8 + y_8)/2 \\ (x_9 + y_9)/2 \\ (x_{10} + y_{10})/2 \\ (x_{11} + y_{11})/2 \end{bmatrix} = \tag{9}$$

$$\begin{bmatrix} 0 & 0 & 0 & 0 & 0 & 0 & 0 & 0 & 0 & h_3 & 0 & h_1 \\ 0 & h_0 & 0 & 0 & 0 & 0 & 0 & 0 & 0 & h_4 & 0 & h_2 \\ 0 & h_1 & 0 & 0 & 0 & 0 & 0 & 0 & 0 & 0 & 0 & h_3 \\ 0 & h_2 & 0 & h_0 & 0 & 0 & 0 & 0 & 0 & 0 & 0 & h_4 \\ 0 & h_3 & 0 & h_1 & 0 & 0 & 0 & 0 & 0 & 0 & 0 & 0 \\ 0 & h_4 & 0 & h_2 & 0 & h_0 & 0 & 0 & 0 & 0 & 0 & 0 \\ 0 & 0 & 0 & h_3 & 0 & h_1 & 0 & 0 & 0 & 0 & 0 & 0 \\ 0 & 0 & 0 & h_4 & 0 & h_2 & 0 & h_0 & 0 & 0 & 0 & 0 \\ 0 & 0 & 0 & 0 & 0 & h_3 & 0 & h_1 & 0 & 0 & 0 & 0 \\ 0 & 0 & 0 & 0 & 0 & h_4 & 0 & h_2 & 0 & h_0 & 0 & 0 \\ 0 & 0 & 0 & 0 & 0 & 0 & 0 & h_3 & 0 & h_1 & 0 & 0 \\ 0 & 0 & 0 & 0 & 0 & 0 & 0 & h_4 & 0 & h_2 & 0 & h_0 \end{bmatrix} \cdot \begin{bmatrix} a_0 \\ a_1 \\ a_2 \\ a_3 \\ a_4 \\ a_5 \\ a_6 \\ a_7 \\ a_8 \\ a_9 \\ a_{10} \\ a_{11} \end{bmatrix}.$$

A decimator 620 may be configured for decimating the sum and difference vectors u and v in order to produce a first set of decimated signals 622 given by:

$$\begin{bmatrix} u_0 \\ u_2 \\ u_4 \\ u_6 \\ u_8 \\ u_{10} \end{bmatrix} = \begin{bmatrix} h_0 & 0 & 0 & 0 & h_4 & h_2 \\ h_2 & h_0 & 0 & 0 & 0 & h_4 \\ h_4 & h_2 & h_0 & 0 & 0 & 0 \\ 0 & h_4 & h_2 & h_0 & 0 & 0 \\ 0 & 0 & h_4 & h_2 & h_0 & 0 \\ 0 & 0 & 0 & h_4 & h_2 & h_0 \end{bmatrix} \cdot \begin{bmatrix} a_0 \\ a_2 \\ a_4 \\ a_6 \\ a_8 \\ a_{10} \end{bmatrix}, \quad (10)$$

$$\begin{bmatrix} v_1 \\ v_3 \\ v_5 \\ v_7 \\ v_9 \\ v_{11} \end{bmatrix} = \begin{bmatrix} h_0 & 0 & 0 & 0 & h_4 & h_2 \\ h_2 & h_0 & 0 & 0 & 0 & h_4 \\ h_4 & h_2 & h_0 & 0 & 0 & 0 \\ 0 & h_4 & h_2 & h_0 & 0 & 0 \\ 0 & 0 & h_4 & h_2 & h_0 & 0 \\ 0 & 0 & 0 & h_4 & h_2 & h_0 \end{bmatrix} \cdot \begin{bmatrix} a_1 \\ a_3 \\ a_5 \\ a_7 \\ a_9 \\ a_{11} \end{bmatrix}, \quad (11)$$

and a second set of decimated signals 622 given by:

$$\begin{bmatrix} v_0 \\ v_2 \\ v_4 \\ v_6 \\ v_8 \\ v_{10} \end{bmatrix} = \begin{bmatrix} 0 & 0 & 0 & 0 & h_3 & h_1 \\ h_1 & 0 & 0 & 0 & 0 & h_3 \\ h_3 & h_1 & 0 & 0 & 0 & 0 \\ 0 & h_3 & h_1 & 0 & 0 & 0 \\ 0 & 0 & h_3 & h_1 & 0 & 0 \\ 0 & 0 & 0 & h_3 & h_1 & 0 \end{bmatrix} \cdot \begin{bmatrix} a_1 \\ a_3 \\ a_5 \\ a_7 \\ a_9 \\ a_{11} \end{bmatrix}, \text{ and} \quad (12)$$

$$\begin{bmatrix} u_1 \\ u_3 \\ u_5 \\ u_7 \\ u_9 \\ u_{11} \end{bmatrix} = \begin{bmatrix} h_1 & 0 & 0 & 0 & 0 & h_3 \\ h_3 & h_1 & 0 & 0 & 0 & 0 \\ 0 & h_3 & h_1 & 0 & 0 & 0 \\ 0 & 0 & h_3 & h_1 & 0 & 0 \\ 0 & 0 & 0 & h_3 & h_1 & 0 \\ 0 & 0 & 0 & 0 & h_3 & h_1 \end{bmatrix} \cdot \begin{bmatrix} a_0 \\ a_2 \\ a_4 \\ a_6 \\ a_8 \\ a_{10} \end{bmatrix}. \quad (13)$$

An equalizer 624 may employ any combination of frequency-domain and time-domain equalization in order to decode decimated signals. Since each of the decimated matrices from equations (10)-(13) is cyclic, computationally less complex frequency-domain equalization may be directly employed instead of computationally more complex time-domain equalization. It can be also observed that the first set of decimated signals given by equations (10)-(11) may only comprise channel-path gains $h_0$, $h_2$, and $h_4$, whereas the second set of decimated signals given by equations (12)-(13) may only comprise channel-path gains $h_1$ and $h_3$. Thus, certain aspects of the present disclosure may be employed for providing some advantages and benefits, such as reducing the effective channel complexity. The difference in the channels between the first and second sets of decimated signals may also be used for diversity advantages. Further benefits and advantages of these and alternative aspects may be realized.

A demapper 628 may input an equalized data stream 626 and may perform the inverse of the symbol mapping operation that was performed by the mapper 306 illustrated in FIG. 3 thereby outputting a data stream 630. Ideally, this data stream 630 corresponds to the data 304 that was provided as input to the transmitter 302, as illustrated in FIG. 3.

Figure 7:
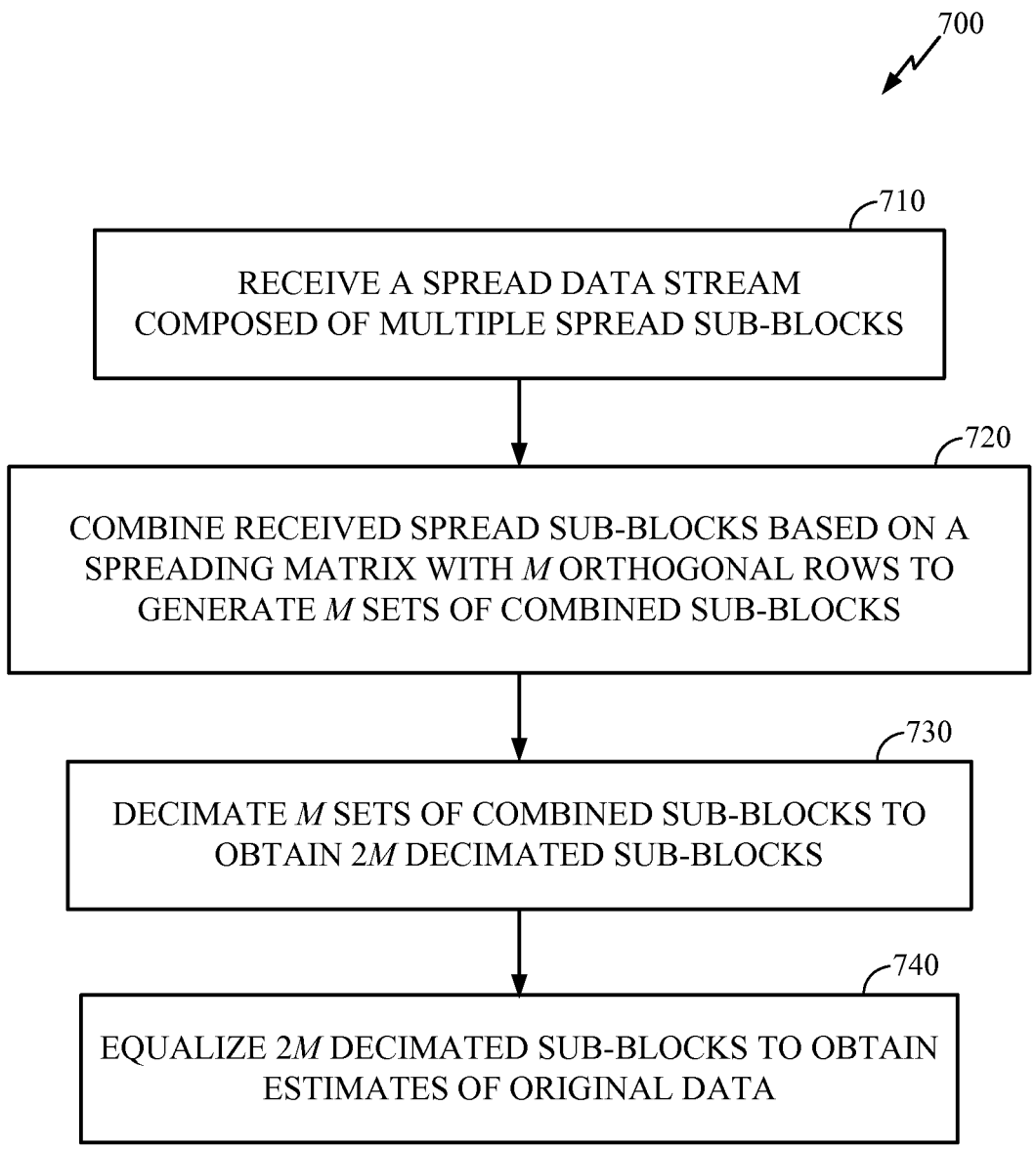
FIG. 7 illustrates example operations for processing of spread signals at the receiver in accordance with certain aspects of the present disclosure.

FIG. 7 illustrates example operations 700 that may be performed to process received spread signals. The receiving method provides for processing signals transmitted by a transmit-side signal processor (such as the one illustrated in FIG. 3) after the signals have propagated through a multipath channel. Receiver front-end processing provides for downconverting and digitizing received signals in order to produce digital baseband signals.

At 710, the baseband spread data stream composed of spread sub-blocks may be obtained. At 720, a plurality of spread sub-blocks may be combined based on a spreading matrix with M orthogonal rows to generate M sets of combined sub-blocks. At 730, M sets of combined sub-blocks may be decimated to obtain 2M decimated sub-blocks of a smaller size.

For certain aspects of the present disclosure when the Hadamard matrix of size 2×2 given by equation (1) is utilized for generating the spread-data sequences, the combining 720 may comprise generating sum and difference sequences. Each of the combined signals (i.e., the sum and difference signals) may be then decimated, at 730, using a decimation factor of two. Thus, decimation may produce four decimation sequences of length N/2.

For certain aspects of the present disclosure when the size 4×4 Hadamard matrix is used to generate the spread-data sequences (such as the sequence illustrated in FIG. 5C), the combining 720 may comprise providing for four sets of combined sequences. Each of the four sets may be generated by first selecting signs of the received spread-data sequences in accordance with a corresponding row of the Hadamard matrix, and then summing the sequences. For example, with reference to FIG. 5C, the four combined signal vectors may be given by:

$$v_0 = s_{0:N-1}^0 \cdot d_{0:N-1} + s_{0:N-1}^1 \cdot d_{0:N-1} + s_{0:N-1}^2 \cdot$$
$$\times d_{0:N-1} + s_{0:N-1}^3 \cdot d_{0:N-1}, \quad (14)$$

$$v_1 = s_{0:N-1}^0 \cdot d_{0:N-1} - s_{0:N-1}^1 \cdot d_{0:N-1} + s_{0:N-1}^2 \cdot$$
$$\times d_{0:N-1} - s_{0:N-1}^3 \cdot d_{0:N-1}, \quad (15)$$

$$v_2 = s_{0:N-1}^0 \cdot d_{0:N-1} + s_{0:N-1}^1 \cdot d_{0:N-1} - s_{0:N-1}^2 \cdot$$
$$\times d_{0:N-1} - s_{0:N-1}^3 \cdot d_{0:N-1}, \quad (16)$$

$$v_3 = s_{0:N-1}^0 \cdot d_{0:N-1} - s_{0:N-1}^1 \cdot d_{0:N-1} - s_{0:N-1}^2 \cdot$$
$$\times d_{0:N-1} + s_{0:N-1}^3 \cdot d_{0:N-1}, \quad (17)$$

Therefore, decimation 730 may produce four decimated sequences of length N/4 from each of the combined signal vectors $v_0$, $v_1$, $v_2$, and $v_3$.

At 740, each of 2M decimated sub-blocks of a smaller size may be equalized to obtain estimates of original data. Since the effective channel matrices of decimation sequences are cyclic, aspects of the disclosure may provide for the frequency-domain equalization with reduced computational complexity.

For the exemplary case of pair of length-12 spreading codes and the five-path multipath channel, even and odd vectors derived from the vector u from equation (8) and converted to the frequency domain may be expressed as:

$$U_e(n) = H_e(n) \cdot A_e(n) + W_e(n), \quad (18)$$

$$U_o(n) = H_o(n) \cdot A_o(n) + W_o(n), \quad (19)$$

for n=0, 1, . . . , N/2−1.

For certain aspects of the disclosure, a minimum mean square error (MMSE) equalizer may be then obtained as:

$$\hat{A}_e(n) = \frac{H_e^*(n) \cdot U_e(n) + H_o^*(n) \cdot U_o(n)}{|H_e(n)|^2 + |H_o(n)|^2 + (1/SNR)}. \quad (20)$$

An inverse fast Fourier transform (IFFT) applied on equalized samples may be then performed in order to produce estimates of even data symbols $a_0, a_2, \ldots, a_{N-2}$.

Similarly, even and odd vectors derived from the vector v given by equation (9) may be utilized to produce estimates of the odd data symbols $a_1, a_3, \ldots, a_{N-1}$. Other aspects of the present disclosure may employ alternative equalization techniques.

Aspects of the disclosure may be configurable for generating code sets, updating code sets, and/or reassigning user codes in response to demand for network resources, changes in the number of users accessing the network, individual user-access requirements, changes in signal-propagation characteristics (e.g., multipath, Doppler, path loss, etc.), and/or interference (e.g., inter-symbol interference, multiple-access interference, jamming, etc.). Aspects of the disclosure may provide for flexible code lengths, support multiple levels of Quality of Service (QoS), and/or allow for system overloading. Aspects of the disclosure may be optimized for minimum processing complexity, such as to enable suitability for real-time applications, rapid updates, low power consumption, and/or low cost processing components. Particular aspects of the disclosure may be configured to provide for the previously recited features and advantages and/or alternative features and advantages.

Figure 4A:
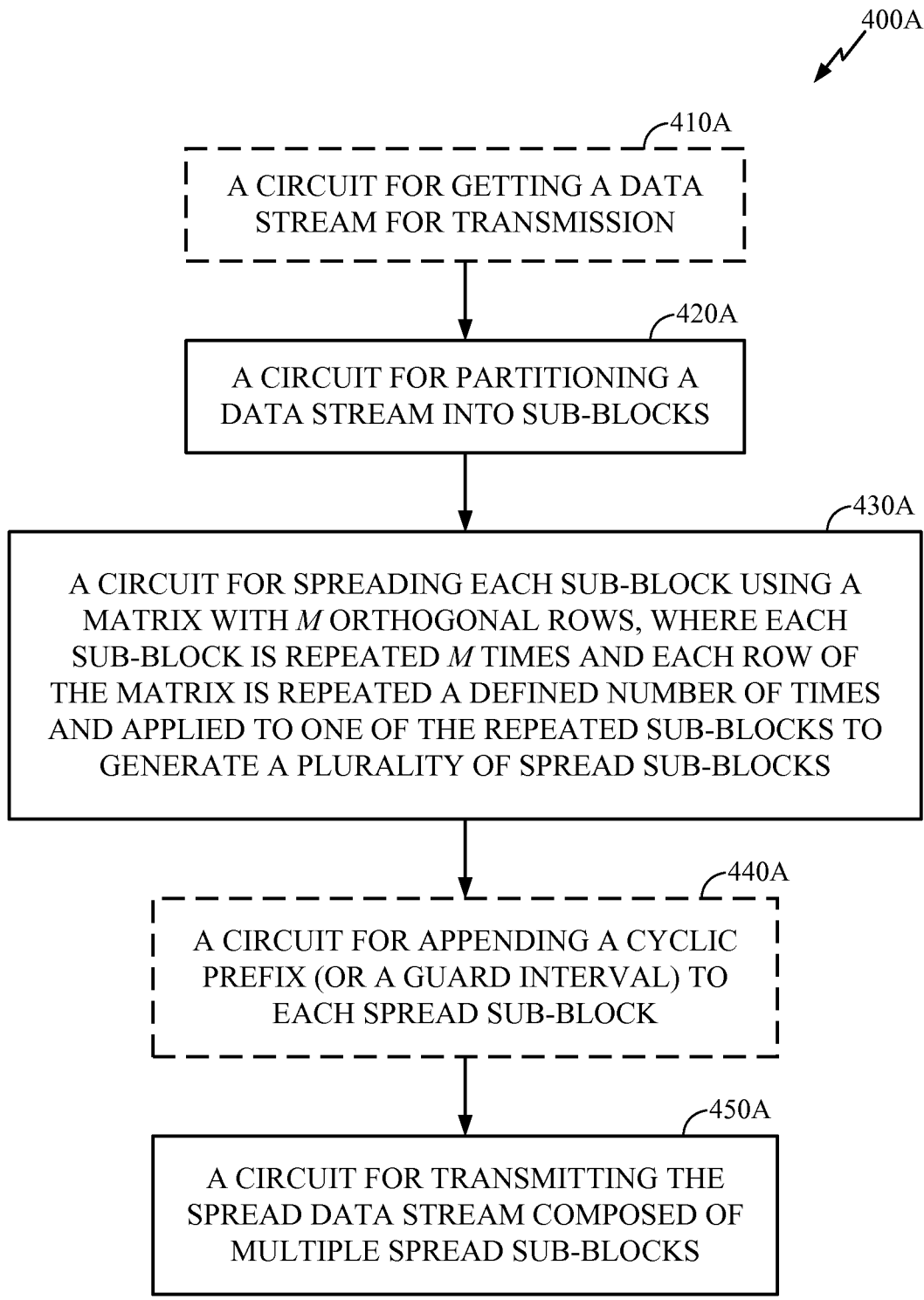
FIG. 4A illustrates example components capable of performing the operations illustrated in FIG. 4.
Figure 7A:
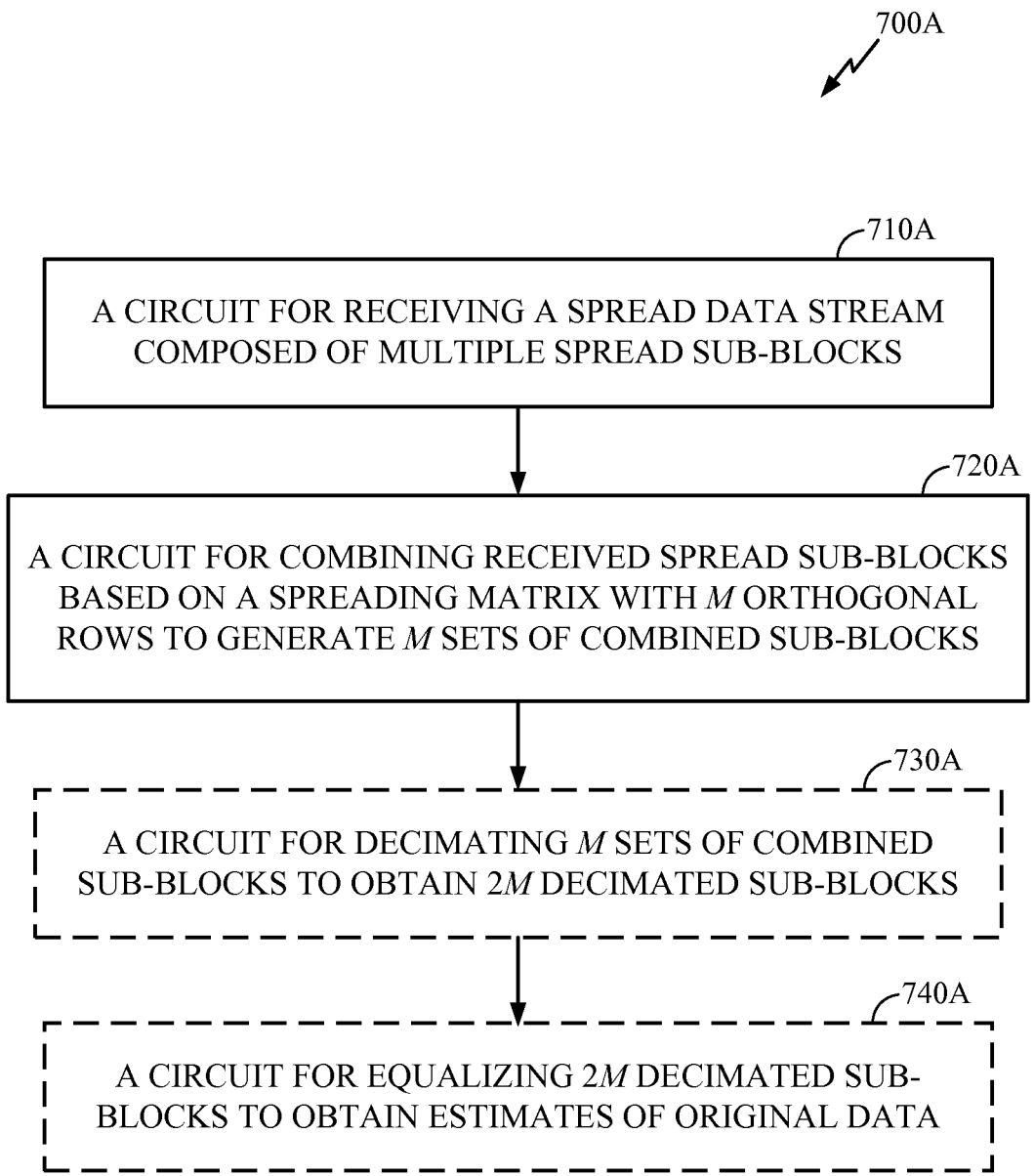
FIG. 7A illustrates example components capable of performing the operations illustrated in FIG. 7.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 410-450 and 710-740, illustrated in FIGS. 4 and 7 correspond to circuit blocks 410A-450A and 710A-740A illustrated in FIGS. 4A and 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by an access terminal and/or access point as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or access point can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point, an access terminal, a personal digital assistant (PDA) or other type of wireless device with processing logic and elements to perform the techniques provided herein.

The invention claimed is:

1. A method for wireless communications, comprising:
partitioning a data stream into sub-blocks of data;
spreading each sub-block using a matrix with M orthogonal rows, wherein the spreading comprises repeating each sub-block M times and applying each row of the matrix to one of the repeated sub-blocks to generate a spread data stream; and
transmitting the spread data stream.

2. The method of claim 1, wherein applying each row of the matrix to one of the repeated sub-blocks comprises multiplying the sub-block element by element with the row of the matrix repeated N/M times, where N is a length of the sub-block.

3. The method of claim 1, wherein the matrix is a Hadamard matrix.

4. The method of claim 3, wherein the Hadamard matrix has two rows and two columns.

5. The method of claim 3, wherein the Hadamard matrix has four rows and four columns.

6. An apparatus for wireless communications, comprising:
a circuit configured to partition a data stream into sub-blocks of data;
a spreader configured to spread each sub-block using a matrix with M orthogonal rows, wherein the spreader comprises a circuit configured to repeat each sub-block M times and a circuit configured to apply each row of the matrix to one of the repeated sub-blocks to generate a spread data stream; and
a transmitter configured to transmit the spread data stream.

7. The apparatus of claim 6, wherein the circuit configured to apply each row of the matrix to one of the repeated sub-blocks comprises a multiplier configured to multiply the sub-block element by element with the row of the matrix repeated N/M times, where N is a length of the sub-block.

8. The apparatus of claim 6, wherein the matrix is a Hadamard matrix.

9. The apparatus of claim 8, wherein the Hadamard matrix has two rows and two columns.

10. The apparatus of claim 8, wherein the Hadamard matrix has four rows and four columns.

11. An apparatus for wireless communications, comprising:
means for partitioning a data stream into sub-blocks of data;
means for spreading each sub-block using a matrix with M orthogonal rows, wherein the means for spreading comprises means for repeating each sub-block M times and means for applying each row of the matrix to one of the repeated sub-blocks to generate a spread data stream; and
means for transmitting the spread data stream.

12. The apparatus of claim 11, wherein the means for applying each row of the matrix to one of the repeated sub-blocks comprises means for multiplying the sub-block element by element with the row of the matrix repeated N/M times, where N is a length of the sub-block.

13. The apparatus of claim 11, wherein the matrix is a Hadamard matrix.

14. The apparatus of claim 13, wherein the Hadamard matrix has two rows and two columns.

15. The apparatus of claim 13, wherein the Hadamard matrix has four rows and four columns.

16. A computer-program product for wireless communications, comprising a computer-readable storage device encoded with instructions executable to:
partition a data stream into sub-blocks of data;
spread each sub-block using a matrix with M orthogonal rows, wherein the instructions executable to spread comprise instructions executable to repeat each sub-block M times and instructions executable to apply each row of the matrix to one of the repeated sub-blocks to generate a spread data stream; and
transmit the spread data stream.

17. An access point, comprising:
at least one antenna;
a circuit configured to partition a data stream into sub-blocks of data;
a spreader configured to spread each sub-block using a matrix with M orthogonal rows, wherein the spreader comprises a circuit configured to repeat each sub-block M times and a circuit configured to apply each row of the matrix to one of the repeated sub-blocks to generate a spread data stream; and
a transmitter configured to transmit via the at least one antenna the spread data stream.

* * * * *